United States Patent [19]
Brummel et al.

[11] 4,211,476
[45] Jul. 8, 1980

[54] CONTACT LENSES WITH ANGULAR ORIENTATION AND STABILIZATION

[75] Inventors: Allan J. Brummel, 44W121 Empire Rd., St. Charles, Ill. 60174; Neil R. Hodur, Chicago, Ill.; Richard Synkoski, Paxton, Mass.

[73] Assignee: Allan J. Brummel, Chicago, Ill.

[21] Appl. No.: 974,232

[22] Filed: Dec. 29, 1978

[51] Int. Cl.² ............................................. G02C 7/04
[52] U.S. Cl. ............................................. 351/160 R
[58] Field of Search ............................... 351/160-162

[56] References Cited
U.S. PATENT DOCUMENTS 3,187,338  6/1965  Neefe .................................... 351/160
3,822,089  7/1974  Wichterle ............................. 351/160

OTHER PUBLICATIONS

Kikkawa, "The Mechanism of Contact Lens Adherence and Centralization", *Am. J. of Optometry and Archives*, vol. 47, No. 4, Apr. 1970, pp. 275-281.
Jessen, G. N., "Physiological Considerations in the Design of Internal and External Surfaces of Fluidless Scleral Contact Lenses", *Am. J. of Optometry and Archives*, vol. 46, No. 4, Apr. 1969, pp. 308-311.

*Primary Examiner*—John K. Corbin
*Assistant Examiner*—Scott J. Sugarman
*Attorney, Agent, or Firm*—Laff, Whitesel & Rockman

[57]  ABSTRACT

A contact lens is constructed with an anterior surface which is radially unsymmetrical and a posterior surface which is composed of multiple curves. The lens is designed to properly adhere and center on the cornea. An aperture or hole is formed in the peripherally located curves, for locally enabling an increase in the magnitude of the fluid forces acting upon the lens. In a properly constructed contact lens, this increase in the fluid forces acting upon the lens creates an effect for tightening the lens fit in the sector of the lens which contains the aperture or hole. Clinically, this sector tightening effect has a magnitude which is capable of holding a properly tailored contact lens, stable in a specifically desired vertical orientation.

6 Claims, 13 Drawing Figures

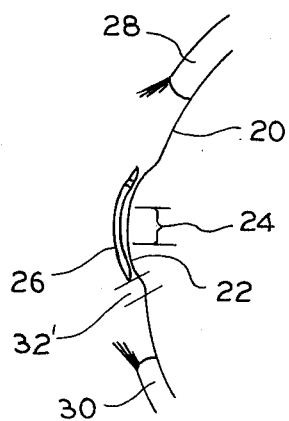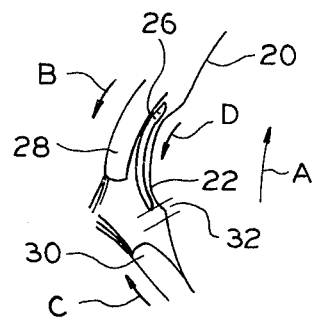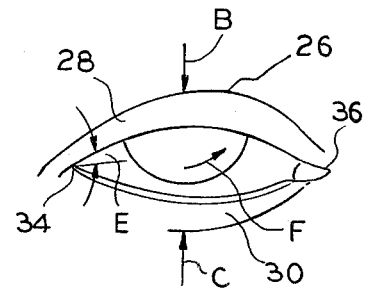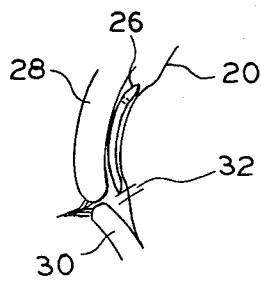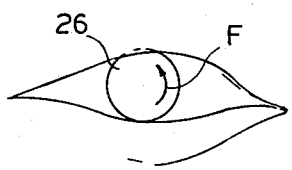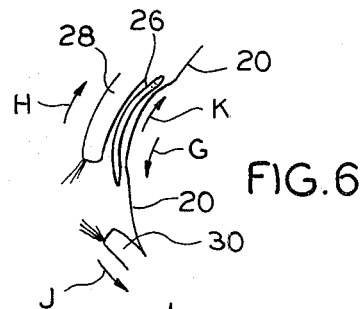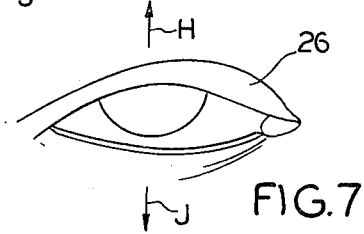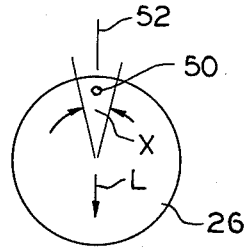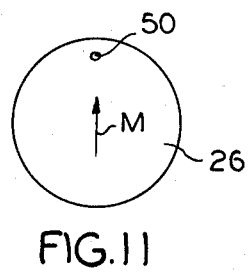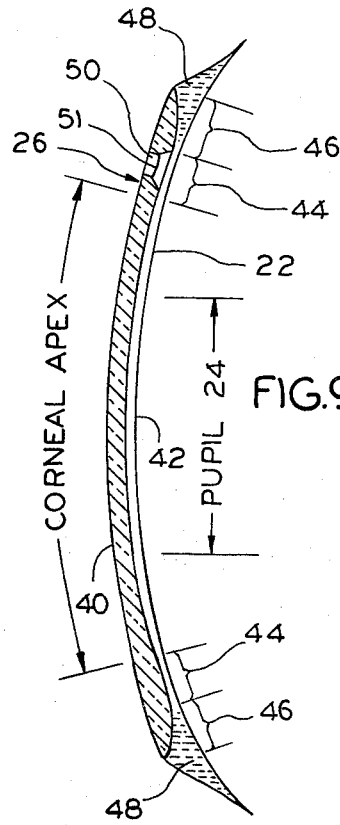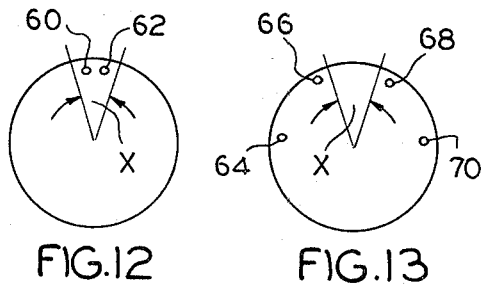

CONTACT LENSES WITH ANGULAR ORIENTATION AND STABILIZATION

This invention relates to contact lenses and, more particularly, to contact lenses with means for establishing and maintaining an angular orientation and stabilization.

One of the most pressing problems facing a clinician in the contact lens field relates the need for, but failure to, adequately correct residual astigmatism. Many statistical surveys suggest that approximately 80-85% of all contact lenses should, but do not, contain astigmatic corrections. A large percentage of unsuccessful contact lens fittings are due to the unsatisfactory handling of this clinical entity. The phenomenon of astigmatic correction has been studied in the literature and numerous attempts have been made to alleviate this problem. However, the problem has heretofore remained unsolved.

Residual astigmatism may be defined as the amount of astigmatism remaining uncorrected after a contact lens has been properly placed upon an eye. Two causes of residual astigmatism are the anatomical features of the eye itself, or a toric surface created between the tear layer and the posterior lens surface. True astigmatism, created by the anatomical features of the eye, is due primarily to lenticular astigmatism. Residual astigmatism, induced by the plastic tear interface, is called induced astigmatism, and is caused by one or more of the following factors: (1) obliquity of light striking the contact lens (usually caused by poor positioning of the lens); (2) relationship between the base curve and the shape of the cornea, resulting in an astigmatic tear layer; (3) changes in corneal shape due to physiological contact lens wear; or (4) a very thin lens dimension, which usually tends to flex and possibly warp when placed on a moderately toric cornea.

Contact lenses which correct astigmatism or which give bifocal correction lead to lenses which must be worn in a predetermined orientation. However, normal eye blinking spins or rotates a contact lens through 360° approximately one or two times every minute. Thus, if asymmetric contact lenses are to successfully correct residual astigmatism or presbyopia, there is a great need for counterbalancing the eyelid blink forces which lead to the rotation of conventional contact lenses.

The physiological needs of corneal tissue depend upon a proper pumping of a tear fluid under the contact lens, during each blink cycle. It is not possible to mechanically secure the lens to the cornea. Traditional attempts at stabilizing this rotational behavior of contact lenses have led to lens designs having excessive mass and overall size. Traditional attempts also have a high rate of patient failure due to sheer discomfort and significant physiological problems with the anterior corneal tissue.

The invention takes advantage of forces which are constantly present in the interaction between the tear fluid and the contact lens, to maintain stability without requiring either excessive lens mass or uncommonly large lens sizes. A properly constructed aperture or hole in a properly tailored contact lens leads to an increase in the magnitude of fluid forces locally acting on the lens at the hole location. These forces stabilize the vertical position of the lens in order to correct and advance the state of the art in the correction of residual astigmatism and presbyopia.

Heretofore, holes or apertures, formed in a contact lens, were designed for other purposes, such as to eliminate a mistiness in the vision, correcting corneal edema. These holes or apertures have been distributed around the lens in a manner such that any stabilizing effect which they might otherwise have had is fairly well cancelled by an equalization of forces around the perimeter of the lens.

Accordingly, an object of this invention is to provide new and improved contact lenses, and especially lenses which counterbalance the rotational effects of the eyelid movements during a blink cycle. Here, an object is to provide contact lenses which need not be radially symmetrical, in order to provide corrections such as astigmatism correcting lenses and bifocal lenses.

Another object is to provide contact lenses which are more comfortable than the lenses produced by traditional attempts to correct astigmatism and presbyopia.

In keeping with an aspect of the invention, these and other objects are accomplished by providing a single small hole or aperture in the peripheral lens region where it floats on a tear film. Due to the interaction of the atmospheric pressure and fluid forces, a meniscus is formed in a layer of tears around the periphery of the lens. The lens is held in place primarily by surface tension contained in the meniscus at the lens edge. In a properly tailored contact lens, a meniscus is also formed at the base of the aperture. Since a meniscus forms and surface tension acts upon both the periphery of the lens and the base of the aperture or hole, the surface tension is greater in the sector of the lens which contains the hole. Also, the lens material removed by drilling the hole makes the top lighter, in weight, than the bottom of the lens. Therefore, as the eye blinks, there is a greatly reduced tendency for the lens to move in the sector containing the hole, as compared to the remainder of the lens which does not contain the hole. Accordingly, the lens sector containing the hole acts somewhat as a tack point at the top of the lens. With the tack point located near the top of the lens, it falls back to a correct optical centering when the blink cycle ends. Thus, there is very little or no rotation of the lens while mounted in the eye.

A preferred embodiment of the invention is shown in the attached drawing, wherein:

FIG. 1 is a schematic representation of a cross section of a fully opened human eye with a contact lens in place over the cornea during normal sight usage;

FIG. 2 is a similar representation of a cross section which illustrates eye movement at the start of a blink;

FIG. 3 is a schematic representation of the lid action corresponding to FIG. 2 but taken at the front of an eye during a blink;

FIG. 4 is a schematic representation of the most likely cross section of a contact lens position on an eye, when the lids are closed at the midpoint in the blink cycle;

FIG. 5 is a front view (corresponding to FIG. 4) of a closed human eye at the midpoint in the blink;

FIG. 6 is a schematic representation of the cross section of an eye starting to open after the midpoint of a blink;

FIG. 7 is a front view (corresponding to FIG. 6) of an opening eye;

FIG. 8 is a schematic cross section representation of a completely open eye, at the end of a blink;

FIG. 9 is a cross section of the inventive contact lens resting on a cornea;

FIGS. 10 and 11 are two graphical representations showing how the inventive contact lens moves over the eye during a blink;

FIG. 12 graphically shows a second embodiment wherein more than one hole or aperture may be distributed within a critical area at the top of a contact lens; and FIG. 13 graphically shows a third embodiment wherein a plurality of holes are distributed outside the critical area in order to produce a net fluid force represented by a resultant vector which lies within the critical area.

The representation of the human eye in the appended drawing is schematic only. It is not intended to have anatomical perfection for any given individual, since there is a great variation in the actual configuration of human eyes.

The representation of FIG. 1 includes the eyeball 20, cornea 22, pupil 24, a contact lens 26, the upper eyelid 28 and lower eyelid 30. Normally, the contact lens 26 is supposed to be centered over the pupil 24. The difficulty is that, during each blink cycle, the contact lens is incrementally rotated, with the bottom of the lens rotating toward the nose and upwardly. Thus, the lens makes one to two complete 360° rotations about every minute.

The reason for lens rotation is set forth in FIGS. 2-8 (which represent one complete blink cycle) and is described in an article entitled "The Effect of the Eyelids on Contact Lens Rotation"—a detailed study by Melvin J. Remba, published April 1961 in "Contacto," The Contact Lens Journal, page 123.

More particularly, as the blink cycle begins (FIGS. 2, 3), the eyeball 20 rolls upwardly in direction A. The upper lid 28 moves downwardly in direction B, while the lower lid 30 moves upwardly in direction C. Obviously, there is a rubbing action between the lens 26 and upper lid 28. Hence, the lens tends to move downwardly (in direction D) over the cornea. The cornea tends to have a slightly greater or steeper curvature in its central region and to be slightly less curved toward its edges. Stated another way, the corneal apex is approximately 1.5 to 2 diopters of steeper curvature, as compared to the curvature at the perimeter of the cornea. The lens 26 is slightly arched as compared to the central region of the cornea. Therefore, as the lens slides downwardly in direction D, the arched back of the lens tends to fit more closely against the contour of the cornea, thereby creating a negative pressure or mild vacuum which tends to restrain further lens movement in direction D. FIG. 2 is drawn to show that the space 32 between the contact lens 26 and the white of the eye has closed somewhat, as compared to the corresponding space 32 in FIG. 1.

Meanwhile, as shown in FIG. 3, the upper lid 28 moves in a somewhat rotary motion (centered upon the outside end 34 of the eyelid) as it squeegees the eye. In greater detail, the opened upper lid 28 normally sits at an angle E of about 15° with respect to its closed position. Therefore, each time that the upper lid 28 closes, it sweeps over the contact lens 26 with a rotary motion, covering about a 15° arc, centered upon the outer corner 34 of the eye. The net balance of eyeball and eyelid forces acting upon the lens 26 rotates it in the direction F.

FIG. 4 shows a completely closed eye with the eyeball 20 rotated upwardly to a stable closed eye position. This is a theoretical showing since no one can actually see the lens location within a completely closed eye. The contact lens 26 is held in a fixed position by a negative pressure between it and the cornea. A small space 32 remains between the bottom of lens 26 and the white of the eye so that the lens continues to rest over the cornea. As seen by the shift in the position in the closed eye represented by the arrows F (FIGS. 3 and 5), the lens 26 has rotated relative to its starting position.

When the eye-opening sequence begins (FIGS. 6, 7), the eyeball 20 begins rolling downwardly in direction G. The upper lid 28 moves upwardly in direction H and the lower lid moves downwardly in direction J. The lens 26 slides upwardly in direction K. However, there an insufficient counter-rotary force to undo the rotation of lens 26 in direction F. Therefore, it remains displaced in the rotary direction (i.e., displaced in direction F, FIG. 5).

By the time that the eyelids open beyond the cornea (FIG. 8), the lens 26 has been moved back so that it is again centered over the pupil 24. The eyeball 20 continues moving downwardly in direction G to align the eye upon the object which it was viewing when it began to close at the start of the blink cycle.

FIG. 9 shows the construction of the contact lens 26. The back of the lens is made with three blended curves 42,44,46. More particularly, the optic cap of the cornea 22 is somewhat steeper in the corneal apex. The lens 26 has a front or anterior surface 40 with a curvature, relative to its central curve or inner surface 42 which is determined by the wearer's individual prescription. If the lens has an anterior surface which gives rise to a radially unsymmetrical lens refractive power, it is necessary to stabilize the vertical orientation of the lens in order to insure correction of astigmatism and presbyopia.

Radially outward, beyond the prescription zone 42, the back of the lens has an intermediate curved zone 44, which supports the lens and which is wide enought to contain the entire hole or aperture. Usually, zone 44 has a width which is less than one millimeter and, preferably, approximately 0.7-0.8 millimeters. Zone 44 has a posterior surface which is substantially parallel to the surface of the cornea at the area where it sits.

Outside the intermediate curve 44, the perimeter or outer edge 46 of the contact lens 26 is curved away from the cornea to provide a standoff edge which enables tears to flow behind the lens and to form a meniscus 48 around the perimeter. This curved edge 46 is an arc of a circle generally having a preferred radius of 11.5 to 13 millimeters, which is a clinically alterable parameter. Thus, lens 26 floats on a tear film or layer and never actually touches the eye itself. All junctions between each of the three curved regions 42,44,46 on the posterior side are blended so that there are no sharp or abrupt discontinuities.

The meniscus 48 forms near the peripheral edge of the lens, as identified by crosshatching. Normally, the meniscus is more sharply curved at the top edge of the lens (as compared to the bottom edge). However, there is not normally a sufficient imbalance of fluid forces to counteract the rotational effects of the eyelid blink cycle upon the lens 26. The preferred lens diameter and, therefore, meniscus-forming edge diameter is in the order of 8.2 to 8.8 millimeters, also a clinically alterable parameter.

According to the invention, a hole or aperture 50 is formed in the intermediate curved region 44 which supports the lens. The bottom of the hole or aperture 50 is counter-bored, to remove sharp edges. A meniscus 51 also forms at the base of the hole 50, which causes a greater amount of surface tension to appear at one point on the lens than elsewhere around its periphery. Therefore, there is a greater surface tension resistance to lens movement at the point where the hole 50 is located. The diameter of the aperture should be less than one millimeter so that it cannot be consciously seen by the person who is wearing the lens. The preferred hole diameter is approximately 0.5 to 0.8 millimeters. Also, the material removed from the lens by drilling hole 50 makes the lens top lighter (or the lens bottom heavier) so that gravity tends to make the lens hang straighter.

The hole 50 is preferably located within an arcuate sector of the lens-supporting, intermediate curve area 44 defined by the 30° angle X (FIG. 10) which extends 15° on opposite sides of a vertical gravity vector 52 taken from the geometrical center of the lens. For most nearsighted people with normal correction, the hole 50 is preferably located approximately 0.3 to 1.1 millimeters from the periphery of the lens. For other prescriptions, other suitable locations may be selected.

With the greater surface tension and lesser weight at the top side of the lens with the hole, the effective lens movement during the blink cycle is straight up and down, as shown in FIGS. 10, 11. The lens 26 moves straight down in direction L (FIG. 10) and rotates when the eye closes. When the eyelids open, the eyeball rolls down and the lens is dragged up by the upper lid. Upon reaching the peripheral corneal region, the lids release the lens and it falls downwardly to the central corneal area, under the influence of gravity and responsive to the unbalanced fluid forces achieved through employment of the inventive design. The detrimental rotational effects of the eyelids are thereby counterbalanced.

The general specifications to be followed in the manufacture of the inventive lens is as follows:

1. All lenses are fabricated with peripheral parallelism between the cornea and lens.
2. All lenses are initially designed to have an intermediate overall diameter of approximately 8.2 mm-8.8 mm; however, this is a clinically alterable parameter.
3. All lenses initially have three curves (with curve radii following the philosophy stated above), fabricated with a moderate blending of the curve junction.
4. The hole 50 is drilled according to individual patient needs.

A modification of the invention is to construct a hole or aperture with a wide angle (60° to bore center) countersink on the anterior surface of the lens and with a small counter sink on the posterior lens surface. This design would both increase the meniscus area and decrease the weight at the top of the lens to provide a ballast below the center of the lens. Another modification is to provide a plurality of holes or apertures having geometrically oriented positions which produce fluid forces which have a resultant vector force acting within the arcuate region lying within angle X (i.e., ±15° of the vertical gravity vector passing through the geometrical center of the lens). For example, FIG. 12 shows two closely-located holes or apertures 60,62 within the very narrow sector of angle X, at the top of the lens.

FIG. 13 shows four holes or apertures 64,66,68,70, none of which fall within the critical area defined by angle X. However, it is elementary mathematics to run a vector analysis of the fluid forces produced by these four holes or apertures. The vector resultant of fluid forces determined by that analysis will fall within the angle X. Stated another way, the holes may be distributed on opposite sides of the vertical gravity vector so that all fluid forces except the vertical ones are balanced out.

Of course, the references to the angle X, the vertical gravity vector, etc., are taken with reference to both gravity and the patient's normal head position. If the patient is a completely normal person who usually holds his head in a generally erect and vertical position, the top of the lens is also taken with respect to the top of a person's head.

However, if the patient should have a physical problem, he might normally hold his head in some position other than erect and vertical. For example, a curvature of the spine might cause the vertical axis of the head to normally rest at, say, a 45° tilt off the vertical position. The forces resulting from the lid action during the blink cycle continues to be taken with respect to the top of the head, while the gravitational effects are tilted 45° off the head vertical.

This abnormal head position poses no substantial problem since both the forces of the lid action and the gravity action are easily calculated by conventional mathematical means. Again, the calculations are such that the resultant force vector rests in the angle X, taken with respect to gravity. Therefore, it is an easy matter to locate the hole so that the lens returns to the proper vertical orientation for correcting astigmatism and presbyopia.

Those who are skilled in the art will readily perceive how to modify the system. Therefore, the appended claims are to be construed to cover all equivalent structures which fall within the true scope and spirit of the invention.

We claim:

1. A rotationally stabilized contact lens having a posterior surface comprising a prescription zone and an intermediate curved, lens support region between said prescription zone and the edge of said lens on the posterior surface of said lens, said intermediate region being substantially parallel to an adjacent toric surface on the cornea when said lens is in place on the eye of a patient, and means located in said intermediate region of said lens for forming a control meniscus with the tear layer of the eye, said means being positioned so that the resultant vector of the fluid forces created by said means falls within an arcuate area defined by the gravity vector passing through the geometrical center of the lens and 15° on either side of said vector, whereby said lens resists angular rotational about the cornea during normal wear.

2. The contact lens of claim 1 wherein said control meniscus-forming means is a hole with countersinks on the anterior and posterior surfaces of the lens.

3. The lens of claim 1 wherein said lens has a construction which gives rise to a radially unsymmetrical lens refractive power.

4. The contact lens of claim 3 wherein said control meniscus-forming means is at least one hole means, said hole means having a diameter which is less than one millimeter.

5. The contact lens of claim 3 wherein said control meniscus-forming means is at least one hole means located in an area approximate which is 0.3 to 1.1 millimeters from the edge of the lens.

6. A method of stabilizing the rotational position of a contact lens comprising the steps of:
   a. forming a contact lens having a posterior surface with a peripheral contour which forms a meniscus around the circumference of the lens;
   b. forming said lens to have a larger apparent circumferential meniscus at the top of said lens than at the bottom of said lens; and
   c. perforating said lens with a meniscus-forming hole near the edge of said lens and within an arcuate area defined by the gravity vector passing through the geometrical center of the lens and 15° on either side of said vector, whereby said hole acts asymmetrically on the lens to maintain the desired rotational orientation of the lens with respect to the cornea.

* * * * *